United States Patent [19]
Meinherz et al.

[11] Patent Number: 5,872,346
[45] Date of Patent: Feb. 16, 1999

[54] METAL-CLADDED ELECTRICAL HIGH-VOLTAGE SWITCHING INSTALLATION WITH A POWER SWITCH

[75] Inventors: Manfred Meinherz; Thomas Kelch, both of Berlin, Germany

[73] Assignee: Siemens Aktiengesellschaft, München, Germany

[21] Appl. No.: 817,557

[22] PCT Filed: Oct. 19, 1995

[86] PCT No.: PCT/DE95/01503

§ 371 Date: Aug. 22, 1997

§ 102(e) Date: Aug. 22, 1997

[87] PCT Pub. No.: WO96/13087

PCT Pub. Date: May 2, 1996

[30] Foreign Application Priority Data

Oct. 21, 1994 [DE] Germany .......................... 44 38 776.8

[51] Int. Cl.⁶ .......................... H01H 33/14; H01H 33/18; H01H 33/70

[52] U.S. Cl. .................. 218/2; 218/45; 218/79; 218/80

[58] Field of Search .................. 218/2, 8, 11, 12, 218/13, 43, 45, 69, 75, 79, 80; 361/611, 614, 621

[56] References Cited

U.S. PATENT DOCUMENTS

| 3,665,257 | 5/1972 | De Heus | 317/103 |
| 5,578,805 | 11/1996 | Berger et al. | 218/43 |
| 5,589,674 | 12/1996 | Berger et al. | 218/71 |

FOREIGN PATENT DOCUMENTS

| 0 152 611 | 12/1984 | European Pat. Off. |
| 0348 313 | 1/1993 | European Pat. Off. |
| 2 003 076 | 5/1971 | Germany . |
| 2 146 625 | 5/1971 | Germany . |

*Primary Examiner*—Wynn Wood Coggins
*Assistant Examiner*—Michael J. Hayes
*Attorney, Agent, or Firm*—Kenyon & Kenyon

[57] ABSTRACT

A high-voltage metal-cladded switchgear having two busbars (1, 2) and a power switch (4) with a first connected to terminals (12, 13) of two isolating switches (10, 11). The power switch has a contact point (17) that can be removed from the enclosure (3) together with the power switch (4) and has at least two contact devices for connection to the terminals (12, 13) of the isolating switches (10, 11). No assembly work is necessary inside the enclosure (3). The internal conductors are connected by inserting the power switch (4).

3 Claims, 2 Drawing Sheets

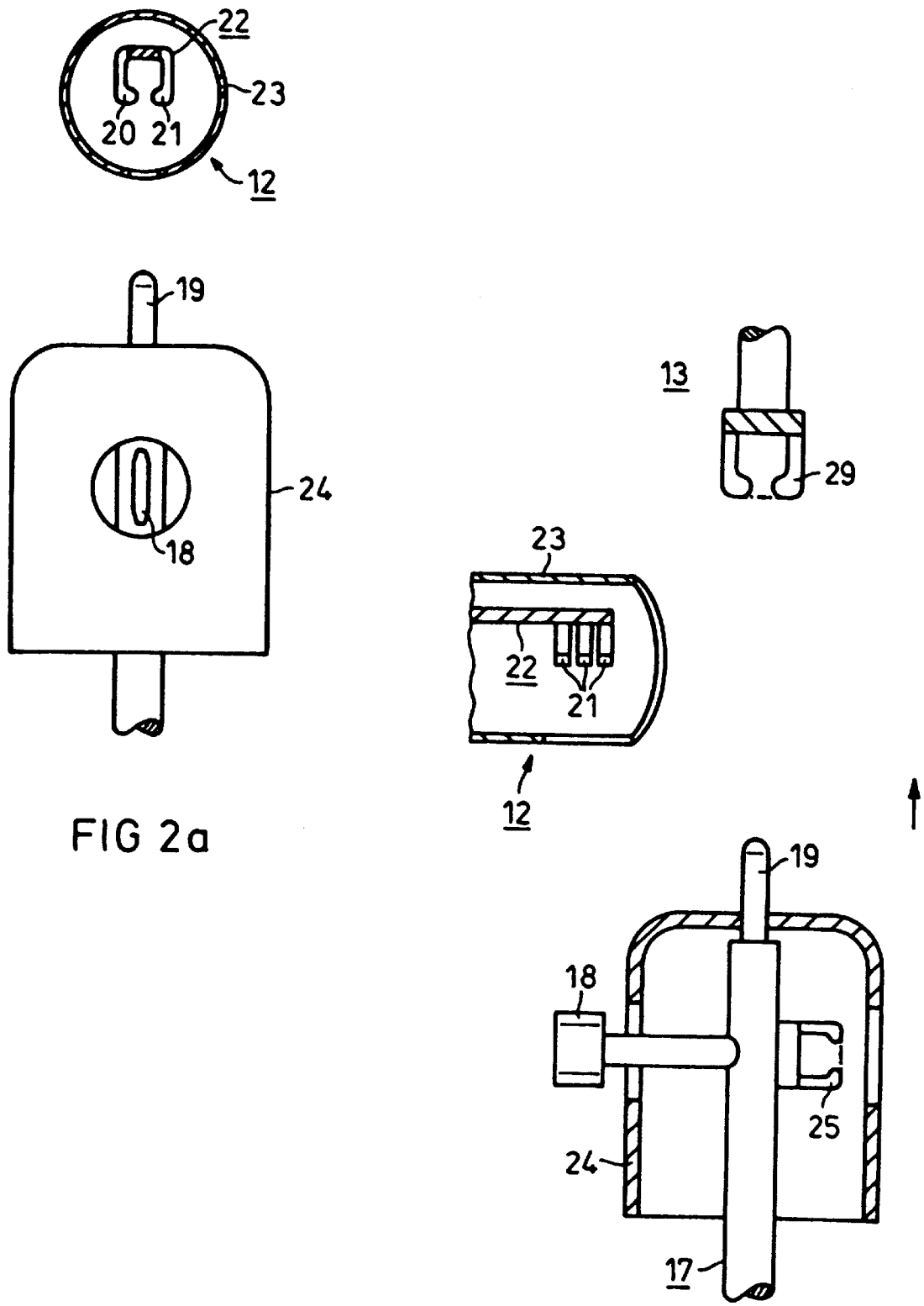

5,872,346

METAL-CLADDED ELECTRICAL HIGH-VOLTAGE SWITCHING INSTALLATION WITH A POWER SWITCH

FIELD OF THE INVENTION

The present invention relates to a high-voltage metal-cladded switchgear.

BACKGROUND INFORMATION

German Published Patent Application No. 21 46 625 and German Patent No. A-20 03 076 describe high-voltage metal-cladded switchgears in which the power switch and the respective busbar are insulated from the isolating switches when the isolating switches are in isolation mode. Closing an isolating switch establishes a conducting connection with the power switch as well as the respective busbar conductor in a relatively complicated manner. The potential of the isolating switches is indeterminate in isolation mode. This can lead to sparkover.

Furthermore, the isolating switches, which have a few moving parts, are susceptible to problems and it is impossible to guarantee with certainty that both isolating switches are always connected to the power switch.

A similar high-voltage switchgear is known from European Patent No. 0 348 313, for example. With the known switchgear, two busbars are provided with isolating switches whose terminals project into the gas space of a power switch, where they are connected using a connecting conductor. The power switch is connected to the connecting conductor.

With this embodiment, assembly and dismantling are very tedious, because the connecting conductor must be connected to the terminals of the isolating switches or disconnected from them again.

European Patent No. A-0 152 611 describes a high-voltage switchgear with a power switch that can also be connected to two isolating switches.

The power switch described there, however, cannot easily be removed from its enclosure, which is separated from the enclosure of the isolating switches and the busbars, without opening the isolating switch enclosure. To remove the power switch, part of its enclosure must also be removed.

The European Patent No. A-0 152 611 also describes a plug-and-socket connection for contacting an isolating switch that is in the gas space of the isolating switches there, which results in the fact that the enclosure of the power switch must be removed to separate the connection between the power switch and one isolating switch.

SUMMARY OF THE INVENTION

The present invention relates to a high-voltage metal-cladded switchgear having two busbars and a power switch to whose first end there are connected the terminals of two isolating switches, one of which connects the power switch to one busbar conductor at a time in the ON state and having a cladding for the power switch in which the terminals of the isolating switches are arranged separately, where one contact point is non-detachably connected to the first end of the power switch and can be removed together with the power switch from the enclosure and has at least two contact devices for electrically connecting the power switch to one isolating switch at a time. The contact devices together with the terminals of the isolating switches form plug-and-socket connections inside the enclosure.

An object of the present invention is to provide a high-voltage metal-cladded switchgear so as to facilitate both assembly and maintenance and simplify the design of the isolating switches and the electric connections.

The aforementioned object is achieved by the fact that the plug-and-socket connections have immovable contact points on the isolating switch side into which corresponding mating contact points can be inserted in the axial direction in assembly by axial insertion of the power switch into the enclosure.

The device of the present invention ensures that when installing the power switch in the enclosure, the first end of the switch will be non-detachably connected to the terminals of the isolating switches without requiring any additional assembly work. No separate connector is needed for connecting the terminals of the two isolating switches. The electrical connection between the power switch and the isolating switches is advantageously established simply by inserting the power switch into the enclosure. There cannot be any assembly errors of the type where the power switch is connected to only one isolating switch. In addition, the electric resistance between the isolating switches and the power switch is kept low because there is only a single detachable connection between the terminals of the isolating switches and the power switch. The potential of the various parts of the isolating switches is determined in each switching state.

Another advantageous embodiment of the present invention provides for the contact point to have another contact device with which a grounding switch provided inside the enclosure works together in the grounding position. Thus, yet another function is integrated into the contact point, namely that of making contact for a grounding switch. This also greatly reduces the assembly cost for the high-voltage switchgear.

Furthermore, it may also be advantageous for the enclosure to be designed so it is at least partially cylindrical and a first isolating switch is arranged at one end of the enclosure in its longitudinal axis and a second isolating switch is arranged on the surface of the cylinder at the same end of the enclosure.

In this case, the two busbars that are connected to the isolating switches are arranged side by side while nevertheless allowing enough space for the isolating switches. One of the contact devices on the contact point may then be arranged on the end face, for example, while the other contact devices are arranged on the side of the contact point. It is possible for the power switch to be inserted axially directly into the enclosure, but it may also be advantageous to first push the power switch a short distance axially into the enclosure and then radially to move it to its final position. The contact devices should be designed accordingly when they are plug-and-socket connections.

BRIEF DESCRIPTION OF THE DRAWINGS

FIGS. 2a and 2b show the diagrams of two different views of the contact point with the contact devices.

DETAILED DESCRIPTION

Figure 1:
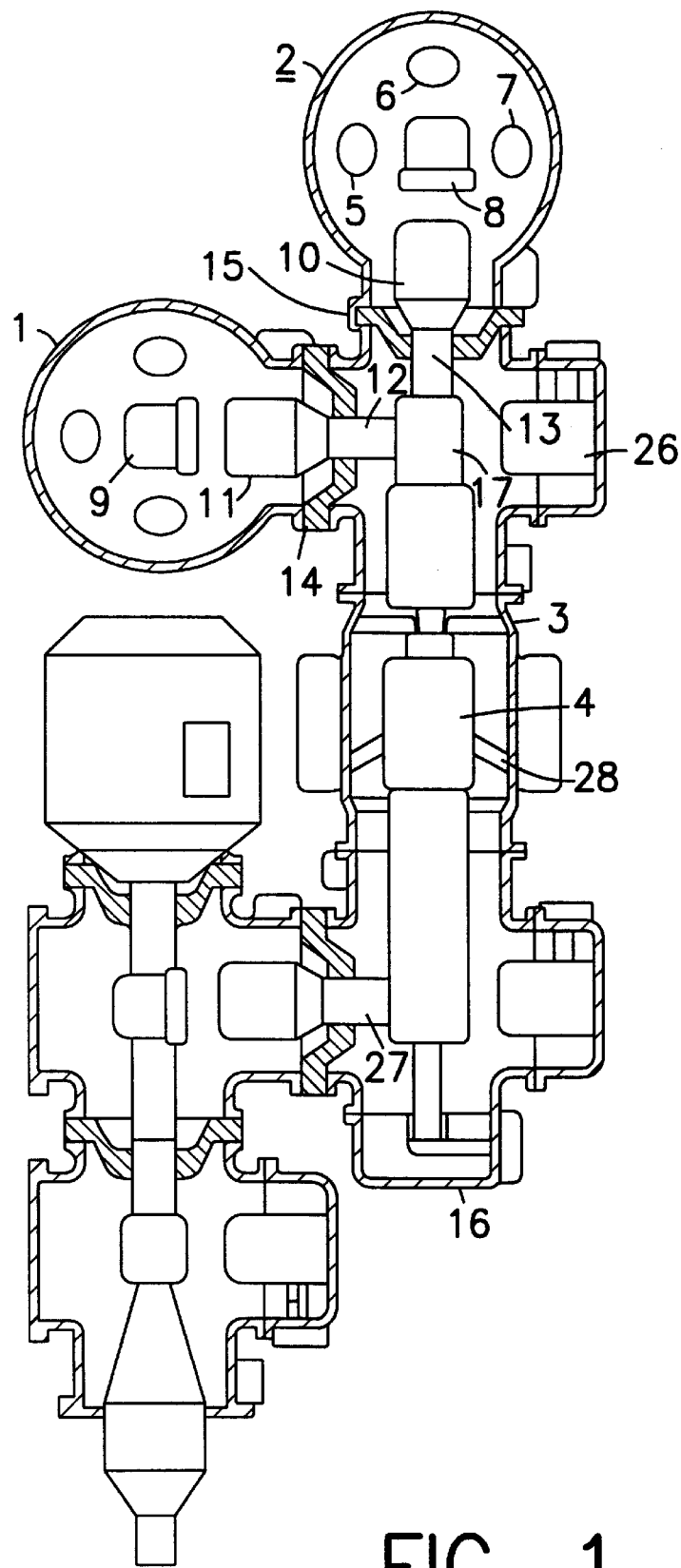
FIG. 1 shows a diagram of two busbars and a cladding with a power switch.

As shown in FIG. 1, two busbars 1 and 2 run parallel to each other and are connected to enclosure 3 of a power switch 4. Each of the busbars 1 and 2 contains three busbar conductors 5, 6 and 7, one of which is connected to a stationary contact point 8, 9 of an isolating switch 10, 11. The isolating switches are arranged in the gas space of busbars 1 and 2. Terminals 12 and 13 of isolating switches 10 and 11 pass in an airtight manner through a bulkhead insulator 14, 15 to which the respective isolating switch 10, 11 is attached.

Power switch 4 is in enclosure 3 and can be inserted into it axially from the end 16 of enclosure 3. Contact point 17 is non-detachably connected to power switch 4 and also has contact devices 18 and 19 (see FIGS. 2a and 2b) for connection to terminals 12 and 13 of the isolating switches. One contact device 18 is designed as a blade contact that works together with contact fingers 20, 21 of a fork-shaped mating contact point 22 of terminal 12. Mating contact point 22 is shielded by metal shield 23.

Contact pin 19 is also carried on contact point 17 and works together with a tulip-shaped mating contact point 29 that is connected to terminal 13 of isolating switch 10 and is also surrounded by a shield.

Contact point 17 also has a shield 24 to make the field uniform.

In addition, a tulip contact 25 that accommodates a contact pin (not shown) of grounding switch 26 in the event of grounding is also connected to contact point 17.

Upon insertion of the power switch 4 into enclosure 3, the blade contact 18 with fork-shaped contact point 22 and pin-shaped contact point 19 engages with the mating contact and thus establishes the electric connection between one end of the power switch 4 and the two isolating switches 10 and 11.

Thus, no additional assembly work is necessary inside the enclosure 3. Instead, the two isolating switches 10 and 11 together with the bulkhead insulators 14, 15 are assembled from the flange openings, and then power switch 4 is inserted from the other side. The connections inside enclosure 3 are established easily using the above-mentioned plug contacts. Dismantling is equally simple.

The high-voltage switchgear disclosed herein is thus a space-saving design that also permits an uncomplicated assembly.

For stability reasons, power switch 4 can be supported by an additional insulator 28 between contact 17 and terminal 27 of another isolating switch. This insulator may consist of several distributed post insulators.

We claim:

1. A high-voltage metal-cladded switchgear comprising:

two busbars;

two isolating switches, each of the two isolating switches coupled to a respective one of the two busbars, each of the two isolating switches including a terminal;

a power switch with a first end connected to the terminals of the isolating switches, wherein each of the isolating switches connects the power switch to a busbar conductor in an on state;

an enclosure enclosing the power switch and the terminals of the isolating switches;

a contact connected to the first end of the power switch and being removable from the enclosure together with the power switch, the contact having at least two contact devices for electrically connecting the power switch to one of the isolating switches at a time, wherein each of the contact devices together with a respective one of the terminals of the isolating switches forms a plug-and-socket connection inside the enclosure and wherein each of the plug-and-socket connections has a fixed contact into which a corresponding mating contact can be inserted axially upon axial insertion of the power switch into the enclosure.

2. The switchgear of claim 1, wherein the contact includes a further contact device which in a grounding position works together with a grounding switch arranged in the enclosure.

3. The switchgear of claim 1, wherein the enclosure has a partially cylindrical surface, a first isolating switch is arranged at one end of the enclosure along an axis of the enclosure, and a second isolating switch is arranged on the partially cylindrical surface at the same end.

\* \* \* \* \*